United States Patent

Scott

[15] 3,699,245

[45] Oct. 17, 1972

[54] PICTORIAL SYSTEMS, HAVING HIGH RESOLUTION IMAGERY AT ALL OBJECT DISTANCES

[72] Inventor: Roderic M. Scott, Stamford, Conn.

[73] Assignee: The Perkin-Elmer Corporation, Norwalk, Conn.

[22] Filed: March 11, 1970

[21] Appl. No.: 18,624

[52] U.S. Cl. .......................................178/6, 178/7.6

[51] Int. Cl. ...............................................H04n 3/10

[58] Field of Search ..........178/6, 7.1 AC, 7.6; 35/12; 343/6

[56] References Cited

UNITED STATES PATENTS

| | | | |
|---|---|---|---|
| 3,370,504 | 2/1968 | Buck et al | 178/7.6 |
| 3,463,882 | 8/1969 | Herbold | 178/7.6 |
| 3,052,753 | 9/1962 | Schwarz et al | 178/6 |
| 3,034,069 | 5/1962 | Fathauer | 178/7.1 AC |

OTHER PUBLICATIONS

High Resolution Digital Light Deflector W. Kulcke et al. Vol. 8, No. 10, of Applied Physics Letters May 15, 1966 pp. 266– 268.

*Primary Examiner*—Robert L. Griffin
*Assistant Examiner*—Barry Leibowitz
*Attorney*—Edward R. Hyde, Jr.

[57] ABSTRACT

A system for obtaining a reproducable image, as for television transmission, of a reduced scale three-dimensional model, exhibits not only high angular and linear resolution, but "infinite" depth of focus. Radiation from a laser, focussed to a spot or "point" source with extremely small angular divergency is formed into a narrow beam which is then deflected by rapidly variable deviator (preferably operating on collimated radiation) to cause a desired scan pattern (e.g., a conventional line by line type of rastor). Additional optical elements cause effective magnification of the original deflection angle without destroying the generally narrow divergency of the scanning beam, as well as causing the effective center of the scanning sweep angle to be located at a point that may be moved extremely close to the model. A photosensitive detector "sees" the entire model to receive the radiation reflected from that part of the model being illuminated by the scanning beam at any given moment. By causing the final scanning beam image to be substantially at the closest point of approach of the scanning system to the model, the linear resolution at critically close distances is "maximized", while the relatively narrow final divergency angle assures high angular resolution at all operating distances. The signal generated by the detector can be processed and transmitted in a manner analogous to conventional television signals.

7 Claims, 3 Drawing Figures

INVENTOR.
Roderic M. Scott
BY
Daniel R. Levinson
ATTORNEY

INVENTOR.
Roderic M. Scott
BY Daniel B Levison
ATTORNEY.

PICTORIAL SYSTEMS, HAVING HIGH RESOLUTION IMAGERY AT ALL OBJECT DISTANCES

GENERAL DESCRIPTION

The present invention relates to an improved optical system, especially adaptable for use in a high resolution television or other camera system. More particularly the invention relates to an apparatus for taking "pictures" (e.g., by means of a television camera) at high resolution of three-dimensional objects over a large proportional range of distances, generally along the optical axis, without requiring any focussing adjustment of the camera optics. Additionally the invention allows taking such "pictures" in such a manner that the more detailed foreground objects are "imaged" with greater linear resolution (relative to their actual size) than the less detailed more distant objects, although both remain effectively "in focus".

The invention is particularly adaptable for use in either television or photographic reproduction of scaled-down three-dimensional models, as are used in various types of visual simulators both in training and under conditions when the real object cannot be readily seen and a picture of a scaled-down model is substituted. Systems of this type may be utilized, for example, for flight training of pilots (see for example the following U. S. Pats: Schaper No. 2,883,763; Klemperer No. 2,979,832; and Schwarz et al No. 3,052,753), as well as for actual landings of real airplanes, in which a pictorial display of a model airport is televised to the pilot as the real airport would appear to him if the visibility conditions allowed him to actually see the airport (see for example the U. S. Pat. No. 2,959,779 to Miller et al).

In all known systems of this type two serious problems, essentially of an optical nature, exist. The first difficulty arises from the fact that as the camera closely approaches a part of the model (for example the beginning of the landing runway) both exact correctness of focus becomes extremely difficult to obtain and the depth of focus becomes extremely small simultaneously, with all types of conventional camera optical systems. Additionally as the camera closely approaches an object, the linear resolution (if measured for example in lines per millimeter) requirements becomes extremely stringent, if the pilot is to see such close objects in the television picture with the same relative clarity as he would in the corresponding near objects of the real airport. For practical reasons, it is advantageous to utilize as small a model as possible, both for economy of construction and in order to keep the size of the model (which may have to represent as much as many miles of runway and surrounding terrain) sufficiently small to avoid a problem in housing it. For example if a 3-mile approach and a 2-mile runway (i.e., a total of over 25,000 feet) were to be represented by a model, a 1:1,000 reduction would be required if the model was not to exceed about 25 feet in length. Assuming such 1,000th reduction scale, a 5 inch object would be 5/1000th of an inch on the model or only ⅛th of a millimeter. If the optical system of the camera is to resolve objects equivalent to this 5 inch "real" size, it must have a minimum resolution of eight lines per millimeter, even when the model object is only 1/100th of a foot (i.e., just over a tenth of an inch) from the television camera, as is required to simulate the "real" 10 foot distance from the pilot to the runway at landing.

If the pilot is also intended to be able to view the whole runway in the model (corresponding to the 10,000 foot real runway) at "touchdown" (i.e., upon the moment of landing), all objects in the model from 1/100th of a foot (i.e., just over 1/10th of an inch) to 10 feet must simultaneously be in reasonable "focus". Assuming that the field of view presented to the pilot must be at least about 40°, it can readily be seen that no conventional optics can obtain a depth of focus from 1/10th of an inch to 10 feet simultaneously.

In order to obtain the exemplary resolution mentioned above, the camera must have an angular resolution of 30 milliradian, regardless of whether the object is approximately 1/10th of an inch or 10 or more feet away (which latter distance is effectively optical infinity relative to an object plane of only 1/10th of an inch distant). Although in theory a 5/1000th inch diameter pinhole might yield the necessary (e.g., 40°) coverage at 30 milliradian angular resolution with a 1/10th inch to 10 foot depth of focus, it is practically impossible to utilize such an "optic" in either a television or photographic camera for moving objects, since the amount of light collected by such a pinhole is necessarily extremely minute (even if the model were extremely brilliantly illuminated).

The invention utilizes an entirely different technique for obtaining from such a model an image, having the requisite field of view, resolution and apparent depth of focus. In particular the inventive system employs an extremely small "pencil" illuminating beam which scans the model (e.g., in the conventional line by line or "flying spot" scanning pattern of a television receiver) essentially on a point to point basis, and a radiation detector which receives the returned (i.e., reflected) light from each individual point of the model as it is scanned. Since such a system is essentially afocal in nature, the basic problem of depth of focus is eliminated. Further by providing that the effective diameter of the illuminating pencil is not only extremely small but is minimized when near objects are being scanned, the effective resolution of the entire system is caused to approximate that of the human eye (relative to the "real" world) even when the actual (model) objects being scanned are only a small fraction of an inch away from the system. For example, as will appear more particularly in the single detailed exemplary embodiment hereinafter more fully described and shown in the accompanying drawings, it is possible to obtain an illuminating pencil having cross-section of only 1/1000th of an inch (0.025 millimeters or 25 microns) at its narrowest point with a divergence of only 8 milliradian, by utilizing a laser source and the type of optical imaging and scanning system shown and described in such exemplary embodiment. Although the slight divergency of the illuminating beam causes the "flying spot" to slowly increase in size for model objects beyond its minimum diameter (i.e., its image plane), the angular resolution of the entire system can be maintained better than, say, 30 milliradians over the entire operating range (say, between 1/10 of an inch to over 10 feet) if the laser illuminating beam divergency is substantially less than this (e.g., 8 milliradians).

Generally speaking, the invention utilizes a laser illuminating beam that has been caused to form a small "point" image, which "emits" radiation only at an extremely small angular spread or divergency (e.g., 8 milliradians). This narrow, extremely slowly diverging "pencil" of light is caused to sweep a relatively large angle (e.g., 40°) in any convenient scanning pattern, for example, the line by line pattern of conventional television. Thus, the model is illuminated at only a very small area at any given moment, although the entire model is ultimately illuminated by the pencil during each entire scanning interval. A fast response photodetector "sees" at least substantially the same (i.e., 40°) field of view as is covered by a complete scan of the illuminating pencil; therefore, at any given time the detector receives reflected light from an extremely small area of the model (hereinafter sometimes referred to as the "point" being illuminated). The electrical output of the detector therefore is an amplitude modulated signal, varying directly with the reflective characteristic of each of the successively scanned "points" of the model. This signal is therefore directly analogous to a conventional (amplitude modulated) television type signal. By utilizing conventional video amplifying and transmission circuits, the electrical output of the detector can be sent to a conventional television receiver, which is in front of the "pilot" (who may be flying either a real airplane or merely operating the simulated controls of a training device).

A system according to the above general description (and particularly of the type of the preferred specific embodiment hereinafter described) thus obtains a high, substantially constant, angular resolution. This is accomplished (not only by insuring that the final image of the light source itself has a small divergency angle, but also) by causing this final image and the point about which the narrow pencil of light from such image is swept over the large (e.g., 40°) scanning angle to be at least quite close to each other and to the nodal point of the receiving (detector optical) system. Therefore, the area illuminated by the scanning "pencil" at any given time subtends only a very small substantially constant angle at the receiver (i.e., the detector system) regardless of whether the scanning system is very close (e.g., 1/10 of an inch) to or very far (e.g., over 10 feet) from the model being illuminated. Thus, substantially constant, high angular resolution is maintained at all operating distances, and the final source image is substantially at the model (or other object) surface when the system is at its closest (e.g., simulation of the near approach of the plane at landing, when the center of sweep of the illuminating scan is only about 1/10 of an inch from the model surface, assuming the exemplary dimensions previously given). In this manner a minimum area (i.e., the dimensions of the light source image) on the model is illuminated (at any given time during the scan) under these most critical close-up conditions, thereby obtaining the maximum practically obtainable linear resolution when it is most difficult to do so. Since the divergency of the beam from this final image is also very small (e.g., 8 milliradians), the angular resolution remains almost constant and very high (e.g., better than 30 milliradians) for all distances between such near approach (e.g., 1/10 of an inch) to distances substantially more remote from the illuminated model surface (e.g., distances of at least 10 feet, which may represent many miles in "real life").

Because the angular resolution of the transmitted or recorded "picture" is both high and substantially constant regardless of the distance of the object and the extent of the field of view being scanned and the linear resolution (as determined by the minimum illuminated area or the "point" of the object being scanned at any given time) is "maximized" when the part of the model "seen" is close to the system, sufficient detail is obtained under the most optically difficult and practically critical circumstance. Since a system according to the invention is by its nature afocal, there is innately no problem either as to adjusting any plane of focus, nor is the system limited in any way by conventional "depth of focus" problems, since in theory the system has an infinite depth of focus.

Accordingly a major object of the invention is to provide a system for "taking" a dynamic "final" picture (for example, of the television type) of a three-dimensional object having a large range of distances (e.g., 1,000:1) from the "camera", wherein both the angular and linear resolution remain high and at least the former is substantially constant for all object-to-"camera" distances even when the effective modal point of the "camera" is moved over a large dynamic range of distances relative to the object, and which system also exhibits a substantially "infinite" depth of focus at all "camera" positions.

A related object of the invention is the provision of a system having any or any combination of the above desirable characteristics, which is capable of "taking" a picture over a relatively large field of view (e.g., 40°).

Another object of the invention is the provision of a system for "taking pictures" at such high angular and linear resolution as to allow the use of a relatively small model while still obtaining (e.g., television) "pictures" thereof which appear to the viewer lifelike because of the preserved detail.

A further major object of the invention is the provision of a system for "taking pictures" of a three-dimensional object which image or picture is effectively in focus over a substantially "infinite" range of distances from the picture-taking system.

Other objects, advantages and features of the invention will be obvious to one skilled in the art upon reading the following detailed description of a single preferred embodiment of the invention, in conjunction with the accompanying drawings, in which.

DETAILED DESCRIPTION

Figure 1:
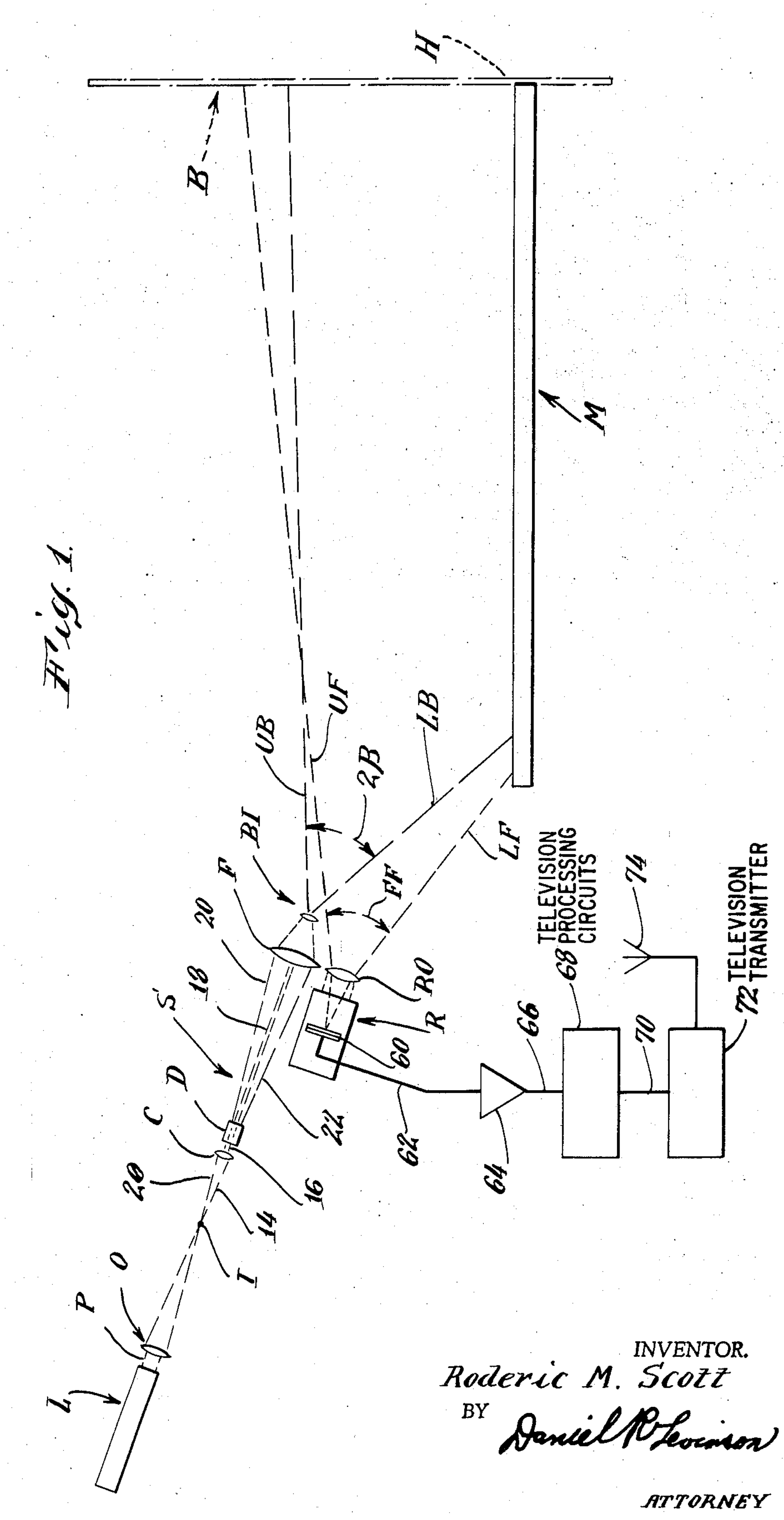
FIG. 1 is a somewhat schematic side elevational view of an exemplary system according to the invention, illustrating the manner in which a three-dimensional object or model is illuminated in a scanning pattern and the reflected light is measured so as to provide a signal analogous to that from a conventional television camera.

In FIG. 1 of the drawing, a model of, for example, an airport and its immediately surrounding terrain is generally shown at M. Such a model is already well known, both in systems of the true air navigation type (see, for example, the Miller et al U. S. Pat. No. 2,959,779 in FIG. 2 at 28) and in training simulators (see, for example, U. S. Pat. No. 2,979,832 to Klemperer in FIG. 1 at 10; and the Schwarz et al U. S. Pat. No. 3,052,753 in FIG. 1 at 12). However, in contradistinction to the systems of, for example, the above last two mentioned prior patents, the model M of the instant FIG. 1 is relatively small (e.g., having a maximum length in the horizontal direction of FIG. 1 of say about 10 feet). Because of these relatively small dimensions of the instant three-dimension model, it may be positioned on a table top, rather than requiring an extremely large room as was typically true of prior art systems (note, for example, FIG. 1 in the above-mentioned Klemperer patent). Although at least some suggested prior art systems (for example, FIG. 1 of the Schaper U.S. Pat. No. 2,883,763) were allegedly capable of utilizing relatively small models by means of a plurality of models, images or "pictures" which were combined, for example, by television "insertion" techniques, nevertheless, such systems are inherently not capable of producing sharp detail of the model when the television (nor other camera) closely approaches the model, not only because of practical difficulty in maintaining proper focus, but more importantly because of the theoretical impossibility of maintaining both very near and moderately distant parts of the model in focus simultaneously. In other words, the optical property of "depth of focus" necessarily limits the distance of the various parts of the model that may be clearly seen at any given time in such prior art systems.

For purposes of concreteness, exemplary dimensions will be mentioned in conjunction with the illustrated exemplary embodiment; however, it should be understood that these dimensions are merely assumed for purposes of convenience of description, and, unless otherwise stated, are neither critical nor in general particularly significant, except for the purpose of better understanding of typical relative sizes, distances, focal lengths, resolutions, other optical properties and the like for such an exemplary embodiment. Thus it is assumed that the model is approximately 12 feet long (the horizontal dimension in FIG. 1) and is approximately on a scale of 1 foot in the model equals 2,500 feet in "real life" (i.e., 12 feet corresponds to roughly 6 miles). Thus, the various three-dimensional objects, representing airport towers, hangers, trees, etc., would be on a reduced scale of 1:2,500. A backdrop B may be provided to simulate sky, as well as any large distant object (e.g., skyscraper or the like) near the horizon, indicated generally at H. If such an optional backdrop is used, it may be either perpendicular (as shown) or at an angle at least generally in the vicinity of (but preferably at least as large as) 90°, relative to the surface of the model M. Such an optional backdrop B may either be a permanent representation (e.g., a painting), or a screen so as to allow different pictures (e.g., "-slides" or motion pictures) to be projected thereon; for example, the backdrop, if present, may be a rear projection screen on which different images, representing different weather conditions, may be projected from the right in FIG. 1.

The remaining structural elements schematically shown in FIG. 1 comprise the entire "camera" or image recording system of the invention. Broadly, the entire "camera" system consists of an illuminating scanning assembly S and a (say photoelectric) detector and "recording" assembly R. The purpose of the scanning assembly S is to illuminate intensely a small area of the model (and backdrop) at any given time and to cause this small illuminated area or "point" to be moved over a relatively large (say 40°) angular field of view in some predetermined pattern. For exemplary purposes it will be assumed that the pattern is otherwise a conventional television flying spot raster or "line by line" type of scanning pattern (say, without interlaced lines). Each of the scanning and the detector-recording assemblies will be described in turn.

The scanning assembly S may comprise a bright source of light, preferably a continuous (gas) laser L, emitting (at its generally right-hand end in FIG. 1) a monochromatic, parallel beam of "light" P (which may be either in the visible region of the spectrum or in the adjacent regions, that is, infrared or ultraviolet). A high quality first objective or imaging optical system O forms an extremely small (i.e., almost true point) first image I. As is now known (see for example the Kogelnik and Li article in Applied Optics, Volume 5 No. 10 Oct. 1966) pages 1550–1557, especially pages 1553 and 1554 including FIGS. 5 and 6 and equation (22) thereon), a laser operating in its fundamental mode has an amplitude distribution of nearly Gaussian shape, and may be focused to a "spot" having a minimum diameter related to the effective divergency angle $\theta$ therefrom given by the equation (22 on page 1553) : $\theta = \lambda/\pi\omega_o$. As may be seen from FIG. 6 on page 1554 and the text of page 1553 of the article, $\theta$ is actually the angle between the optical axis and the asymptote of the hyperbole of the spreading contour of the beam at such a "beam waist" or plane of best focus of the diffraction-limited image; $\lambda$ is the wavelength of the (monochromatic) radiation from the laser; while $\omega_o$ is the half-height (or radius) of the "beam waist" or diffraction-limited image at the plane of best focus.

Although the objective system O should be of extreme high quality (i.e., "diffraction-limited") optics, such an optical system is well within the state of art since the radiation is necessarily monochromatic, so that the system need not be corrected for any "color" (chromatic) type of aberrations. Of course the actual optical system would be more complex than the schematically-represented single lens at 0. The image of "-beam waist" I thus acts as almost a perfect point source, having a very small divergency angle of the radiation emitted (to the left) therefrom. Thus, both in FIG. 1 and in the more detailed view of FIG. 2, the effective divergency angle $2\theta$ is illustrated larger than its actual size (which may be for example 1°), because of the practical difficulty of showing to scale such a very small angle. Similarly, the focal length of the first objective (i.e., the distance from 0 to I) may be (and in general will be) substantially longer than implied by the relative lengths of the optical paths in FIG. 1. The slightly divergent radiation beam 14 from the bright small image I impinges upon a collimating optical system C (represented by a simple lens, but preferably comprising a highly corrected for monochromatic light, more complex lens) whereby the beam at 16 is composed of almost perfectly parallel rays.

The same parallel rays are indicated at 18 after passing through a variably deviating means D, when the deviator is "neutral" or effectively inoperative. This deviator D may be of the type, for example, discussed and shown in the early part of chapter 23 on pages 371 and following (which chapter is authored by W. Kulcke, et al) of the book Optical and Electro-Optical Information Processing, edited by James T. Tippett, et al, published by The Massachusetts Institute of Technology Press (Cambridge, Massachusetts and London, England) in 1965. A similar device is shown in the relatively short W. Kulcke et al article in Applied Physics Letters, Volume 8 No. 10 (May 15, 1966) pages 266–268. Since in the illustrated embodiment of the invention the radiation is parallel at the deviator or deflector D, a device having less stringent requirements than that of the deflectors shown and described in the latter part of just mentioned chapter 23 and in the article can be utilized (see, for example, FIG. 1 on the second page 372 of chapter 23 of the book).

Figures 2, 3:
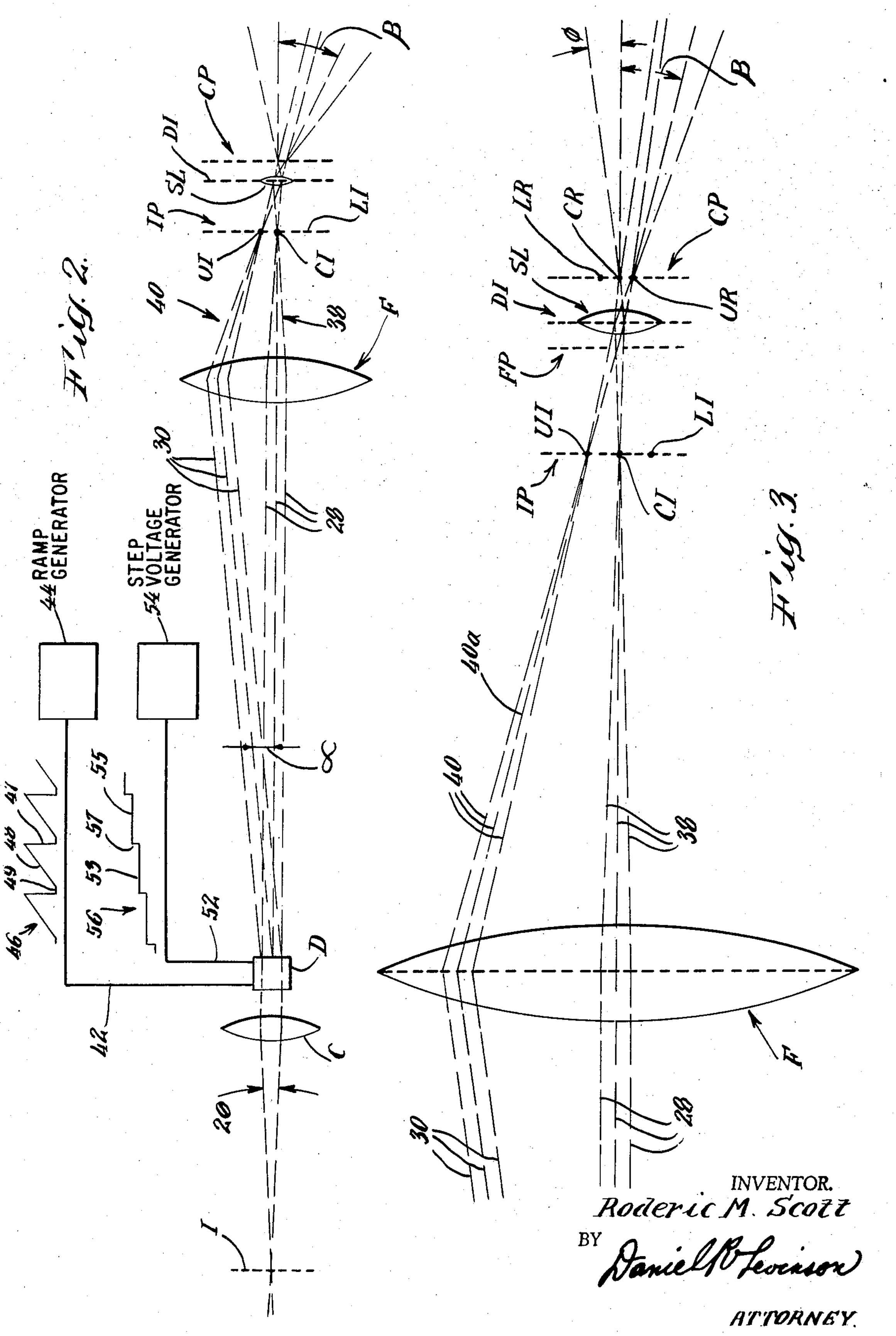
FIG. 2 is a somewhat schematic representation of a preferred exemplary scanning assembly utilized in the system of FIG. 1.
FIG. 3 is an enlargement of the right-hand part of the FIG. 2 scanning assembly.

The electrical signals utilized to modulate the various stages of such a deflector or deviator would include a conventional television horizontal sweep voltage (i.e., a series of constantly varying ramp voltages with zero levels in between) for causing continuous, say, horizontal deflection of the parallel beam (i.e., pivoting about D in a plane perpendicular to the plane of the paper in FIGS. 1 and 2 of the drawings) for each horizontal scan line; while a time-spaced series of increasing step voltages would be applied to cause a "digital" shift of the scanning beam in the vertical direction after each complete horizontal line scan (again as in a conventional television scanning pattern, but, say without an "interlaced" or alternate line scan). In this manner a conventional line-by-line rectilinear scan (directly analogous to non-interlaced television scanning) can be accomplished by deviator D. The fact that the parallel beam of radiation (shown at its non-deviated or non-deflected position at 18) is caused to be angularly deflected in this manner is exemplary illustrated at 20 and 22, representing respectively the "highest" and "lowest" vertical position of a typical (say, central) one of the parallel rays at the beginning and the end of one complete field scan.

The electrical signals to the deviator D causing such an exemplary line-by-line (television type) scanning pattern are schematically illustrated as being supplied thereto by two separate leads 42,52 (see FIG. 2). In particular, the repetitive horizontal line scanning signal would be supplied over lead 42 by a conventional ramp generator schematically illustrated at 44; an exemplary ramp voltage therefrom is diagramatically shown just above lead 42 at 46. Such voltage of course consists in the main of a series of gradually increasing voltages (as at 48) separated by rapidly decreasing voltage portions 47 (during "flyback") and preferably also extremely short blanking (zero-voltage) portions, as at 49. The "-vertical" input lead 52 is supplied by a series of small step voltages from a circuit 54 of known type. A portion of such a group of step voltages are diagramatically shown at 56, such stepped signal comprising a series of increasing d.c. voltage portions (as at 53,55) and a very short rise or step portion as at 57, connecting each of the d.c. voltage "plateaus", (e.g., 53,55). As is well known, the "length" or time of each horizontal portion 53,55 etc. will be the same as the "period" or repetition rate of the horizontal ramp signals 46; so that the vertical portions 57 will occur between the increasing (voltage) ramp parts 48 of the horizontal scanning signal. Obviously, there will be as many "different steps" (as at 53,55 etc.) as there are horizontal lines in the particular raster pattern utilized. When the signal 56 has reached a d.c. level corresponding to the maximum vertical deflection, the vertical signal 56 will return to its other extreme value (either zero or the same maximum value but opposite sign d.c. voltage). Obviously, the entire signal 56 will then be regenerated again so as to cause the step-like vertical deflection during the next entire raster scan pattern. Although for purposes of explanation it has been assumed that a non-interlaced rectilinear scan pattern is utilized, obviously any other pattern may be used instead (including not only conventional interlaced television scanning, but, for example, a spiral or any other desired scan pattern).

A relatively large aperture focussing system or lens F converges the parallel rays to a relatively small bright image BI. In particular, as may best be seen in FIGS. 2 and 3, this image will be a small bright spot or substantially point source, which will move in the image plane IP of focussing system F in direct correspondence to the manner in which the deflector D moves the parallel rays. Thus, in FIGS. 2 and 3, three exemplary parallel rays 28, representing the upper, central and lower rays of the undeviated collimated beam will be converged as converging rays 38 by the positive focussing system F to a small central image CI; this of course corresponds to the situation as if the deviator D were not present or, alternatively to the central line of the scanning pattern (i.e., when the deviator is neutral or non-deflecting).

The three exemplary parallel rays 30 in FIGS. 2 and 3 represent the uppermost, central and lowermost rays of the collimated beam when the deviator D has caused the greatest upward deflection (compare the analogous single ray 20 in FIG. 1), corresponding to the situation when the highest (say, first) line of the pattern is being scanned. These rays 30 (and of course the rest of the "-bundle" of parallel rays forming the collimated beam in this uppermost deflected position) will be focussed by lens F as converging rays 40 to uppermost image UI (FIGS. 2 and 3). Obviously for vertical deflections caused by the deviator D between this greatest upward deflection (i.e., rays 30, focussed rays 40 and uppermost image UI) and the zero or neutral deflection (exemplified by parallel rays 28, converging rays 38 and central image CI), a whole series of discretely different parallel beams (analogous to 28 and 30), converging beams (similar to that represented by rays 38,40) and images (like CI and UI) at intermediate heights will be formed. Similarly, the deflection in a downward direction will cause analogous rays and images to be formed, which are not shown (in order to avoid confusion in the drawing) in FIGS. 2 and 3, except as to indicate the position of the lowermost image LI formed by such (lowest) line scan in the lower half of the scanning pattern.

A very strongly convergent final optical system (which may be a microscope objective, for example), schematically illustrated as a single strong lens SL is positioned beyond the image plane IP of the telescopic system formed by lenses C and F (i.e., the image plane of the original beam waist or image I of the laser beam as formed by the collimating lens C and the focussing objective F). Preferably the strong lens SL (or more particularly the effective stop of the multi-element optical system which would actually be used) is positioned at the conjugate image plane of the deviating means D as formed by the focussing lens F (alone), namely, the deviator image plane DI, so as to avoid unnecessary loss of radiation without requiring a large diameter clear aperture of the very strong optical system SL. The (necessarily short) focal length and the position of the strong lens SL are so chosen that the image plane IP is not only to its left (in FIGS. 2 and 3) but is substantially further to the left than the first principal focal plane FP of strong lens system SL (see FIG. 3). For this reason the strong lens SL reimages, at the (image side) conjugate focal plane CP, the various images formed in the (corresponding conjugate object) image plane IP of the focusing lens F as further final reimages. For example, the central image CI will be formed as central final image or reimage CR, the uppermost image UI will be reimaged at UR, and the indicated lowermost image LI will be reimaged at LR (see FIG. 3). Since the image plane IP of the original images (CI, UI, LI, etc.) is substantially to the left of the first principal focal plane FP of strong lens system SL (i.e., is more than twice the focal length of SL away), the reimaged spots or "points" (CR, UR, LR, etc.) will actually be smaller and brighter than the original images (CI, etc.). On the other hand, the final sweep angle $\beta$, ultimately caused by the deviator D will be substantially greater than the original sweep angle $\alpha$ (see FIG. 2) originally caused by the deviator D. On the other hand, the effective divergency angle $\phi$ will be larger (which is theoretically worse) than the original divergency angle $\theta$ as measured at the original image source I, which original divergency angle has already been quantitatively defined by the equation earlier in this specification.

OPERATION

The general relationships between the (desirably large, such as 20°) final sweep half-angle $\beta$ and the original sweep half-angle $\alpha$ of the deviator (which because of the practical considerations cannot be made as large as desired, and may be only, say, 1° or so), and between the final effective divergency angle $\phi$ and the theoretically diffraction limited divergency angle $\theta$ of the original laser image I will subsequently be explained in both somewhat general terms, and, for purposes of concreteness, will be related to a set of specific practical (but not critical) assumed values for the various parameters of the system (including, for example, the various distances between the elements, the focal lengths of the various lenses and the like). For the present it will merely be assumed that the final sweep half-angle $\beta$ is approximately 20°, so that the entire field of view swept will comprise 40°, as measured about the central point in plane DI (which will be at or near the optical center and/or nodal point of the final strong optical system SL). Thus, referring to FIG. 1, the final field of view illuminated by the moving laser beam will be defined in the vertical direction by the two extreme rays, namely, the uppermost beam UB and the lowermost beam LB, define the total field sweep angle 2 $\beta$. Obviously a similar effect also occurs in the horizontal plane (not shown) although the exact sweep angle may be either somewhat less or more than the vertical field of sweep angle 2 $\beta$.

As previously explained, the model M (and the background B, if utilized) will be illuminated on a point-to-point basis by the scanning laser beam. The receiver R, will "see" substantially the same entire field, as schematically illustrated by its upper and lower field-of-view defining rays, namely, upper field ray UF and lower field defining ray LF. In order for the receiver objective lens RO to gather returned (i.e., reflected) radiation from any part of the field that is being instantaneously illuminated by the scanning laser beam, its full field-of-view angle FF should be at least as great as the larger of the two (vertical and horizontal) scanning or sweep angles, the vertical one of which is of course 2 $\beta$. Preferably the entire receiver R (including its objective RO) moves with the entire scanning system S, so as to maintain at least approximate matching of the scanning systems sweep angle and the field of view of the receiver; alternatively a "-zoom" type of optical system can be used at RO to effect optically the equivalent of such physical conjoint movement. If the two systems (R and S) move together, the effective nodal point of RO should be at least reasonably closely adjacent the general position of BI in FIG. 1 (or more particularly the plane DI in FIGS. 2 and 3). The radiation detector 60 of the receiver will therefore receive radiation from that particular point in the field of view which is being instantaneously illuminated at a particular time, so as to produce an electrical signal on its output lead 62 which is proportional to the intensity of such radiation returned from the illuminated "point". A conventional high frequency preamplifier and amplifier 64 will then produce a stronger (say, linearly proportional) signal on its output 66, which may be fed to conventional television circuits for any necessary conventional processing at 68 and finally (over lead 70) to a television transmitter 72, which will transmit to the (say, conventional) television receiver in the airplane or aircraft trainer in front of the "pilot" by means of antennae 74.

Having now completely described in general terms how the device is both constructed and operates, the desirable characteristics will now be described, showing how an exemplary specific embodiment can obtain the desired resolution over an effectively large "depth of focus". Initially it will be shown that the results obtained by a system according to the invention cannot be practically accomplished by a conventional camera system. Merely to make the description more concrete, a particular set of relationships between the "real life" scene and the model will be assumed. The practical difficulty of utilizing a conventional (i.e., focussing type) camera or other optical system will be seen from the first set of exemplary criteria concerning the practical requirements of a reasonably precise system.

Let it be assumed that a 12,000 (i.e., (i.e. just under 2 ½ miles) airport runway and immediately surrounding (longitudinal) strip of terrain are to be depicted on a, say, 12-foot long table (i.e., the horizontal dimension of the model M in FIG. 1). Thus, objects on the model will be at a reduced scale of 1:1,000. At the moment of landing the pilot would be approximately 10 feet from the real runway (because of the height of the cockpit above ground level in a conventional commercial multi-engine plane). This 10 feet in "real life" would be represented by only 0.01 feet (i.e., about 0.1 inches) distances between the "camera" and the model runway. Thus a conventional (say, television) camera would have to be capable of focussing from 0.01 feet to more than 12 feet; more importantly, it would have to "take pictures" of reasonable sharpness of model objects that were approximately as close as 0.01 feet and ones that were say 1 feet away simultaneously. In order to obtain the highest practical resolution limit of a television receiver, such "pictures" would have to be taken by the camera of the model at extremely high resolution. For example, a television receiver might be capable of resolving 0.005 inches on its screen, which at a viewing distance (by the pilot) of say 14 inches would be an angular resolution of approximately 1/3 of a milliradian; this roughly corresponds to the actual ability of a "good" (or corrected by an opthalmic lens) human eye.

In order to achieve the optimum resolution described above, the maximum linear resolution would have to be at the minimum "taking distance" approximately ⅓ of a milliradian times the 0.01 feet "camera" distance. Thus, the absolute resolution at the model under these more unfavorable (close) conditions would be $0.33 \times 10^{-3}$ radians multiplied by $10^{-2}$ feet, or $0.33 \times 10^{-5}$ feet, which is about $4 \times 10^{-5}$ inches or slightly better than ½ of 1/10,000 of an inch linear detail. Because of the impracticality of making a 12 foot long model, having this extremely precise detail (0.00005 inches), a reasonable compromise would be to require only a "real world" resolution of about 5 inches, corresponding to the more practical requirement of 0.005 inches of resolvable detail on the model. This equals 0.125 (i.e., ⅛) mm of detail, or in conventional optical terms is equal to eight lines per mm linear resolution. A conventional "-camera" optical system would require an angular resolution of approximately 30 milliradians to resolve even this detail, and this resolution would have to be obtainable from the lens covering an angular field of view of say 40°; more importantly this high (angular) resolution would have to be obtainable simultaneously from say 0.01 feet to at least about 10 feet or more (effectively optical infinity). Obviously only a "lens" of extremely small aperture could exhibit the required depth of focus. For example, a 0.005 inch pin hole would have approximately this required depth of focus, and such a pin hole does have a diffraction limit of resolution on the order of 30 milliradians. However, such a tiny pin hole cannot practically gather sufficient light to produce an acceptable say, "television picture" even if the model is brilliantly illuminated by conventional means.

Compared to the almost insurmountable difficulties of designing a conventional camera system having relatively high resolution over such an extreme depth of focus, the present system can easily obtain 30 milliradians angular resolution over an (almost) "infinite" depth of focus. If a helium-neon laser is utilized for example at L (see FIG. 1) so that the radiation wavelength is approximately $6 \times 10^{-4}$mm, the equation given near the beginning of the specification (that is equation 22 on page 1553 of the previously mentioned Kogelnik et al article) has a solution, utilizing a chosen value of 0.001 inches or $2.5 \times 10^{-2}$mm as the desired cross-section of the "beam waist" at I (FIGS. 1 or 2), of a divergency angle $\theta$ of $8 \times 10^{-3}$ (i.e., 8 milliradians).

Assuming these dimensions of the first image I of the laser beam, may write the diameter or "height", $h$, of the final reimages (CR, LR, UR, etc.) in the final conjugate plane CP as:

$$h=\omega_o (f_F/f_C)\cdot(d_{CP}/d_{IP}), \qquad 2$$

where: $f_F$ is the (back) principal focal length of lens F; $f_C$ is the (front) principal focal length of the collimating lens C; $d_{CP}$ is the distance from the nodal point of optical system SL to the (image side) conjugate focal plane CP; and $d_{IP}$ is the distance from the SL nodal point to the corresponding object (CI, UI, LI etc.) in the image plane IP of the previous lens (F).

The half angle $\beta$ through which the final beam is deviated is given by the relationship:

$$\tan\beta=(d_D/d_{DI})\tan\alpha, \qquad 3$$

wherein: $d_D$ is the distance between the deviator D and the focusing system F; $d_{DI}$ is the distance between this same focusing lens and the image plane of the deviator (DI) formed thereby; and $\alpha$ is the original deflection angle of the deviator, typically no more than about 1° for the type of high-frequency optical deviators referred to previously e.g., those shown in the Kulcke et al book chapter and the Kulcke et al article previously mentioned). As will be seen from the typical numerical example below, the final sweep angle $\beta$ will be substantially larger than the original deflection angle $\alpha$; for example wherein the maximum value of the deflection angle $\alpha$ may be about 1°, the maximum value of the sweep half-angle may be 20°, by positioning of the deviator D a relatively large distance in front of the focusing lens F relative to the principal focal length of F, so that the ratio of the distance of the object conjugate plane to the distance of the image conjugate plane is a relatively large number (e.g., approximately 20).

The beam spread or divergency angle $\phi$ (see FIG. 3) of the final scanning beam (that is, of the extreme right-hand beam in each of the figures) is related to the original divergency angle $\theta$ at the first laser image or beam waist I by the following relationship:

$$\phi=\theta(f_F/f_C)(d_{IP}/d_{CP}), \qquad 4$$

wherein the various symbols in the fractions are identical (but in a different relationship) to those of equation 2. It may be noted that in the exemplary specific embodiment illustrated, the focal lengths $f_F$ and $f_C$ are at least substantially equal, so that the first fraction in each of equations (2) and (4) is substantially equal to unity. On the other hand, $d_{IP}$ is approximately twice as large as $d_{CP}$, so that the second fraction in equation (2) is roughly equal to one-half, while its inverse, the second fraction of equation (4) is approximately two.

Assuming that it is desired to obtain a 20° final scanning half-angle $\beta$ (so as to obtain a 40° field of view), and that the deviator D is practically limited to a maximum deflection angle $\alpha$ of about 1°, we may substitute these exemplary values into equation (3) thusly:

$$\tan 20° = (d_D/d_{DI})\tan 1°; \qquad 3a$$

substituting the values of these tangents, yields:

$$0.364=(d_D/d_{DI})\,0.0174, \qquad 3b$$

or rewriting:

$$(d_D/d_{DI})=(0.364/0.0174)=20.7$$

If the lens F is positioned, say, 40 inches from the deviator D (i.e., $d_D = 40$ inches) and the focal length ($f_F$) of this optical system F is, say, 1.91 inches, from the well-known optical relationship that the sum of the reciprocals of the object and image conjugate distances equals the reciprocal of the focal length, we may write, in both general and in numerically substituted form:

$$1/d_{DI}+1/d_D=1/f_F\text{, and} \qquad 5$$

$$1/d_{DI}=1/1.91-1/40=0.525-0.025=0.5, \qquad 5a$$

so that $d_{DI}$ is about 2 inches.

For the assumed distance between the deviator D and the focusing optical system F (i.e., 40 inches) and the assumed maximum deflection angle $\alpha$ of 1°, the optical system F would have to have a half aperture of 0.7 inches, so that the whole clear aperture of this system F would have to be 1.4 inches.

Since the distance ($d_{CI}$) from lens F to the image plane of the deviator DI is, say, about 2.1 inches, and since the strong lens SL is placed in this image plane (at DI), the distance ($d_{IP}$) between the image plane IP and the strong lens SL is necessarily the difference given by: this 2.1 inches minus the distance ($f_F$) of this principal image plane (IP) from lens F, or 2.1 minus 1.91, so that $d_{IP}$ is about 0.19 in the exemplary embodiment. If the strong optical system SL has a focal length of about 0.065, it will reimage the various images (CI, UI, LI, etc.), which are in its object plane IP 0.19 inches away, at a final conjugate image plane CP at a distance ($d_{CP}$) of approximately 0.1 to the right of SL. Thus, the final images or reimages CR, UR, LR, etc. will be formed only this 1/10 of an inch behind the image plane of the deviator image DI, but nevertheless are " exposed" (i.e., are to the right of the last physical element) so that the scanning system, and in particular this final plane CP may be brought extremely close (that is, at least almost as close as 1/10 of an inch) to the model surface when simulating actual landing of the airplane.

Even the specific exemplary embodiment, including the exemplary numerical data just given, still possesses one unspecified parameter. In particular, the focal length ($f_C$) of the collimating lens C (and therefore obviously the distance between the original laser image I and this lens C) may be chosen to satisfy the condition that the undesired divergency $\phi$ of the ultimate scanning beam (see the right-hand side of FIG. 3) can be limited to, say, 30 milliradians, according to equation (4) above. This allows for compensation of the characteristics of both of the particular laser L e.g., diameter of its output beam, P) utilized as the ultimate source, and of the first objective or imaging optical system 0 (for example, its dioptric power and therefore its focal length).

A single specific embodiment of the invention has been described, involving an exemplary usage in simulated aircraft landing systems, and including, purely for ease and concreteness of explanation, specific exemplary numerical data. However, it will be obvious to those skilled in the art that the invention is not limited to any single field of use; and even more obvious is the fact that of the various specific details and especially the numerical data may be varied according to well-known optical principles, when either different usages or different scaling factors are contemplated. Accordingly, the invention is not deemed to be limited to any of the details or exemplary numerical values hereinbefore mentioned, but rather is defined solely by the scope of the appended claims.

What is claimed is:

1. A system for obtaining a visually discernable picture of a three-dimensional object over a large range of distances in the longitudinal direction extending generally parallel to the optical axis of said system capable of providing, without focussing adjustment, in-focus representations of different parts of said object that are at substantially different longitudinal distances at high angular resolution at all distances, and at high linear resolution especially at close distances, comprising:

source means for generating an intense radiation beam having an extremely small angular divergency;

means for rapidly deviating such radiation beam in a repetitive manner in two non-parallel directions to sweep said beam so as to cause it to scan in a particular two-dimensional pattern;

a first lens means positioned in front of said deviating means for forming sweeping intermediate spot images from said rapidly sweeping beam in a first image plane in front of said first lens means, and for forming in a second image plane in front of said first image plane an image of said deviating means;

a second lens means having a conjugate object plane coincident with said first image plane of said first lens means, so as to reimage said intermediate spot images as sweeping final spot images said second lens means conjugate image plane;

said second lens means being positioned at said second image plane of said first lens means and therefore at said image of said deviating means, so that said final spot images sweep about a pivot which is substantially adjacent to said second lens means;

wherein said second lens means is a short focal length, of such strong converging focussing power lens so as to produce its front principal focal plane substantially closer to said second lens means than said first image plane of said first lens means, so that said conjugate image plane at which said final spot images are formed is substantially adjacent to said second lens means thus causing said final spot images to be even smaller and of higher intensity than said intermediate spot images;

radiation receiving and detecting means for collecting and for amplitude detecting returned radiation from at least that portion of the object having small parts thereof illuminated by the narrow illuminating beam emanating from said sweeping final images at any given moment;

electrical means for processing the amplitude-modulated electrical output from said detecting means so as to produce a continuous final electrical signal which varies in proportion to the intensity of said returned radiation from each of said object parts as they are scanned by said narrow illuminating beam;

and means for converting said final electrical signal into a form capable of yielding a visual representation of the returned radiation intensity from each small part of said object portion which is scanned by said scanning system comprising said source means, said deviating means and said optical means.

2. A system according to claim 1, in which:
said source means comprises a laser and means for focussing the radiation beam from said laser to a substantially diffraction-limited first spot image (I).

3. A system according to claim 1, in which:
said deviating means is of such construction that said two non-parallel directions are perpendicular to each other.

4. A system according to claim 3, in which:
said deviating means is of such further construction that it deflects said intense radiation beam in said two directions by an angular amount which is substantially proportional to two electrical signals.

5. A system according to claim 4, in which:
said deviating means further comprises means for supplying a first repetitive electrical signal which increases in a substantially linear manner for a particular interval and then rapidly returns to its lowest value,
whereby said deviating means deflects said beam in said first direction by a gradually increasing angle and then returns said beam to an initial opposite position.

6. A system according to claim 5, in which:
said deviating means further comprises means for supplying a second electrical signal which maintains a constant voltage level for a relatively short time interval, then increases to a somewhat different constant voltage level, continues to repeat this action so as to form a series of increasing D.C. voltage step levels, and ultimately returns to an original level and regenerates a similar series of step voltages,
whereby said deviating means causes said intense radiation beam to sweep in a first direction through a gradually increasing angle and then to return back to its original position; and whereby said deviating means additionally causes said radiation beam to move in a series of incremental steps in said second direction, so that said beam ultimately scans a repetitive line by line raster pattern.

7. A system according to claim 1, in which:
said first lens means is positioned in front of said deviating means a large distance which is many times greater than its focal length, so that the second image plane of said first lens means at which said image of said deviating means is formed is much closer to said first lens means than said deviating means,
whereby the sweep angle of the deviated beam relative to the deviating means is effectively enlarged into a larger sweep angle as measured relative to said image thereof, thereby effectively increasing the effective angular sweep range of the deviating means.

* * * * *